May 6, 1924.

F. F. DILLON

WINDOW SHADE SUPPORT

Filed March 16, 1923

1,492,556

INVENTOR
Frank F. Dillon,
BY
Arthur M Hood
ATTORNEY

Patented May 6, 1924.

1,492,556

UNITED STATES PATENT OFFICE.

FRANK F. DILLON, OF SPICELAND, INDIANA, ASSIGNOR TO LUTHER O. DRAPER.

WINDOW-SHADE SUPPORT.

Application filed March 16, 1923. Serial No. 625,451.

*To all whom it may concern:*

Be it known that I, FRANK F. DILLON, a citizen of the United States, residing at Spiceland, in the county of Henry and State of Indiana, have invented a new and useful Window-Shade Support, of which the following is a specification.

My invention relates to improvements in means for mounting window shades and has for one of its objects, that of mounting a window shade so that the same may be readily moved to varying distances toward or away from, the window.

My invention is particularly applicable to that type of window in which the sash is hinged and swings on a central pivot intermediate of the top and bottom of the sash.

Figure 1:
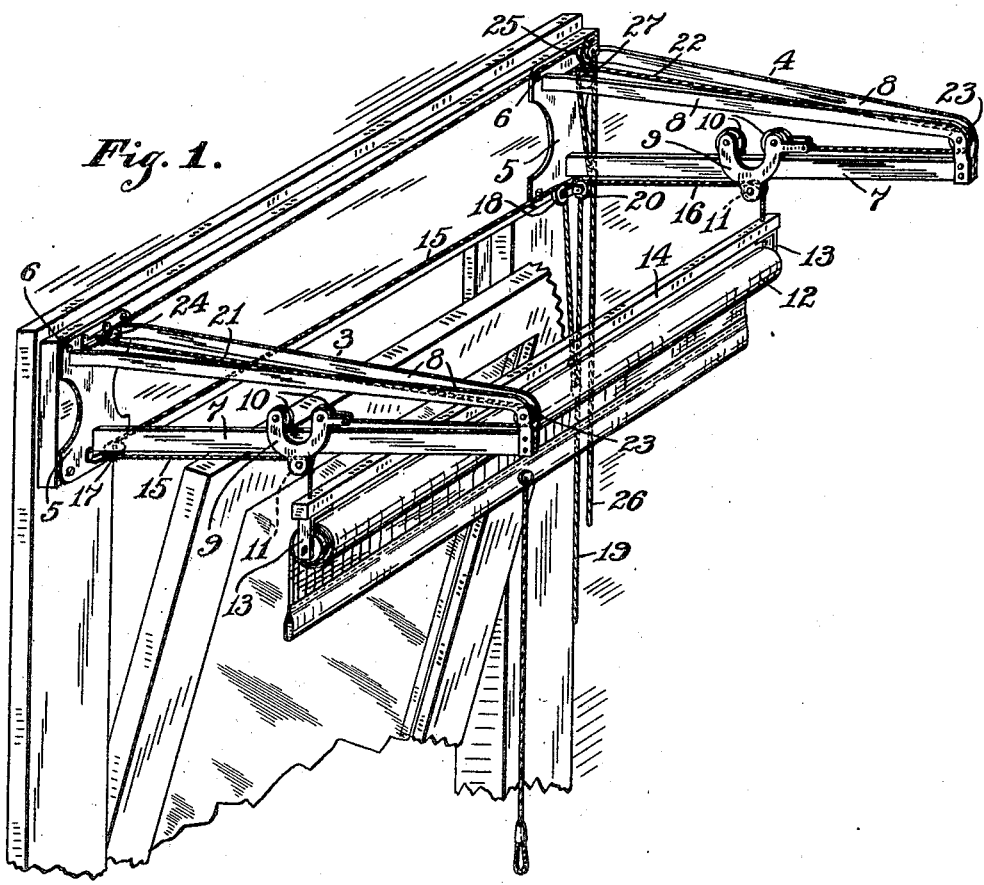
Figure 2:
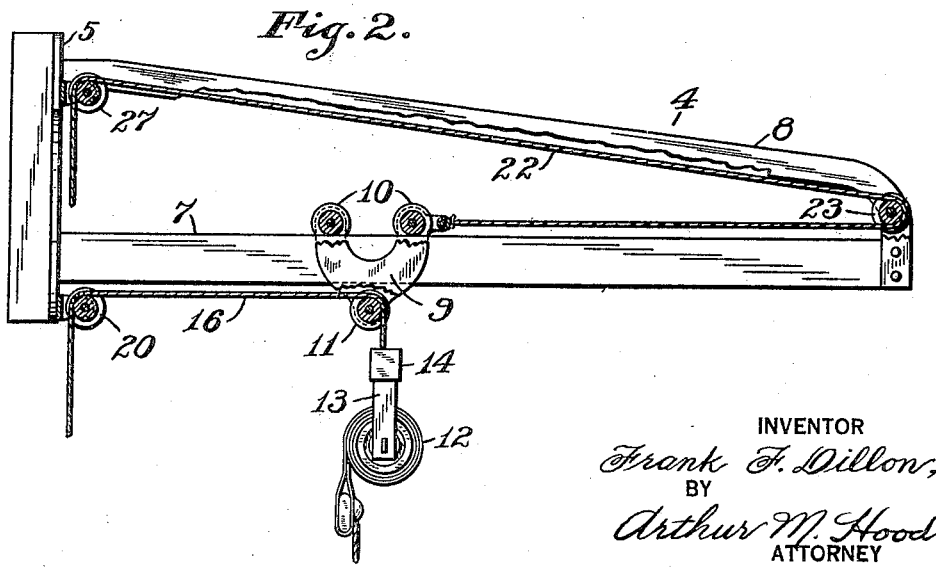

For the purpose of disclosing my invention I have illustrated one embodiment thereof in the accompanying drawings, in which, Fig. 1 is a perspective view of the sash mounting embodying my invention;

Fig. 2 is a side elevation thereof partly in section.

In the structure illustrated I provide a pair of brackets 3 and 4 adapted to be secured at the top of the window frame and on opposite sides of the window. Each of the brackets comprises a base 5 provided with suitable screw holes 6 by which it may be secured in position, and this base supports a trolley track 7 which extends horizontally from, and at right angles to, the window frame. The track is braced by suitable bracing arms 8, the inner ends of which are secured to the top of the base 5 and the outer ends secured to the outer end of the track 7. The outer ends of the braces are preferably turned downwardly at right angles to the brace proper to permit the connecting of the brace to the arm and at the same time leave a clearance between the brace and the arm. A trolley 9 operates upon the track 7 and is provided with a pair of trolley wheels 10 on which it travels on the track and with a roller 11 for a purpose more fully hereinafter disclosed.

The roller shade 12 is mounted between suitable clips 13 mounted upon the under side of a cross bar 14. This cross bar is supported from a pair of cables 15 and 16 passing respectively over the rollers 11 of the trolley of each of the brackets 3 and 4. The cable 15 likewise passes over a pulley 17 on one of the bases 5 and thence across the window to a second pulley 18 on the opposite base. It thence passes downward and merges into a single operating cable 19. The cable 16 passes over a pulley 20 mounted on the same base as the pulley 18 and thence passes downward and merges into the cable 19. For drawing the trolleys toward the outer ends of the tracks, I provide a pair of cables 21 and 22. The cable 21 has one end attached to the trolley which it is adapted to control and then passes outwardly along the trolley track and thence over a pulley 23 mounted between the ends of the braces 8. The cable thence passes rearwardly over a pulley 24 on one of the bases 5 and thence across the window and over a pulley 25 downwardly until it merges into a single operating cable 26.

Cable 22 is connected to the opposite trolley in the same manner as described with respect to cable 21 and passes rearwardly and over a pulley 27 and downwardly to merge into the single operating cable 26.

In operation, by manipulating the single cable 26, the trolleys 9 may be moved outwardly on the tracks 7 to any desired position where they will be maintained by tying the cable 26. Due to the fact that the cables 15 and 16 which support the supporting bar 14 extend rearwardly and over pulleys at the rear end of the tracks, the weight of the curtain will exert a constant tension on the trolleys tending to move them inwardly so that when the cable 19 is tied the trolleys will be held in their adjusted position. When it is desired to move the shade in toward the window, it is merely necessary to loosen the cable 26, when the weight of the window shade will cause the trolleys to travel toward the window. If, however, it is desired to maintain the shade in its same relative position, the operator may manipulate the cable 19 to take up the slack as the trolleys move inwardly. Likewise, if it is desired to vertically adjust the shade bodily, this may be done by manipulating the cable 19.

I claim as my invention:

1. In a window shade support, the combination with a pair of tracks arranged to project from the window frame, of trolleys mounted for travel on said tracks, a window shade supported from said trolleys, means for bodily raising and lowering said shade from said trolleys and means for moving said trolleys on said tracks.

2. In a window shade support, the combination with a pair of tracks arranged to project from the window frame, of trolleys mounted on said frame, cables attached to said trolleys arranged for moving the same outwardly away from said frame, a window shade, and supporting cables for said shade passing over said trolleys, the weight of said shade tending to move said trolleys inwardly to the frame.

3. In a window shade support, the combination with a pair of tracks arranged to project from the window frame, of trolleys mounted on said frame, means for moving said trolleys in one direction on said tracks, a window shade, and supporting cables for said shade passing over said trolleys, the weight of said shade tending to move the trolleys in a direction opposite to said first mentioned moving means.

4. In a window shade support, the combination with a pair of tracks arranged to be mounted to extend from the window frame, of supporting trolleys arranged to travel on said tracks, means for manually moving said trolleys in one direction and a window shade supported from said trolleys in such a manner as to tend to move the trolleys in the opposite direction.

5. In a window shade support, the combination with a pair of tracks arranged to be supported to project from the window frame, of a pair of trolleys mounted to travel on said tracks, a cable arranged to be secured to each end of a window shade and passed over a supporting member on the trolley and rearwardly to the base of the track, and a second cable for each trolley secured thereto and arranged to pass outwardly to the front of the track and then rearwardly toward the base of the track.

6. A shade support comprising a pair of brackets each including a base, a track mounted on said base and a brace secured at one end to the base and at its opposite end to the free end of the track, a trolley mounted on said track, a supporting bar for a window shade, cables secured to each end of said bar and arranged to pass over pulleys on the trolleys and rearwardly to the base of the track, and cables for moving said trolleys outwardly attached to the trolleys and arranged to pass over pulleys mounted at the free end of the track and hence rearwardly toward the base of the track and means on said bar for supporting a sash therefrom.

7. In a window shade support, the combination with a pair of tracks arranged to project from the window frame, of trolleys mounted for travel on said tracks, a rigid supporting member vertically adjustably supported from said trolleys and a window shade mounted on said supporting member.

8. In a window shade support, the combination with a pair of tracks arranged to project from the window frame, of trolleys mounted for travel on said tracks, a supporting bar vertically adjustably supported from said trolleys and a window shade mounted on said supporting bar.

9. In a window shade support, the combination with a pair of tracks arranged to project from the window frame, of trolleys mounted for travel on said tracks, a window shade arranged to be supported from said trolleys, operating cables for moving said trolleys away from the frame on said tracks and a second set of operating cables, said second set of cables being arranged to vertically bodily adjust the shade and to move the trolleys inwardly on said tracks.

10. In a window shade support, the combination with a pair of tracks arranged to project from the window frame, of trolleys mounted on said frame, cables attached to said trolleys arranged for moving the same in one direction on said tracks, a window shade and supporting cables for said shade passing over said trolleys, the weight of said shade tending to move said trolleys in the opposite direction on said tracks.

In witness whereof I, FRANK F. DILLON, have hereunto set my hand at Spiceland, Indiana, this 8th day of March, A. D. one thousand nine hundred and twenty three.

FRANK F. DILLON.